United States Patent
Zou et al.

(10) Patent No.: US 10,332,241 B2
(45) Date of Patent: Jun. 25, 2019

(54) BIAS CORRECTION IN IMAGES

(71) Applicant: Biomediq A/S, Copenhagen Ø (DK)

(72) Inventors: Bin Zou, København N (DK); Akshay Sadananda Uppinakudru Pai, Søborg (DK); Lauge Sørensen, Copenhagen (DK); Mads Nielsen, Dragør (DK)

(73) Assignee: BIOMEDIQ A/S, Copenhagen Ø (DK)

(*) Notice: Subject to any disclaimer, the term of this patent is extended or adjusted under 35 U.S.C. 154(b) by 0 days.

(21) Appl. No.: 15/511,770

(22) PCT Filed: Sep. 16, 2015

(86) PCT No.: PCT/EP2015/071248
§ 371 (c)(1),
(2) Date: Mar. 16, 2017

(87) PCT Pub. No.: WO2016/042037
PCT Pub. Date: Mar. 24, 2016

(65) Prior Publication Data
US 2017/0243336 A1    Aug. 24, 2017

(30) Foreign Application Priority Data

Sep. 17, 2014 (GB) .................. 1416416.4

(51) Int. Cl.
G06T 5/00 (2006.01)
G06T 5/50 (2006.01)
G06T 7/30 (2017.01)

(52) U.S. Cl.
CPC .............. *G06T 5/007* (2013.01); *G06T 5/50* (2013.01); *G06T 7/30* (2017.01); *G06T 2207/10088* (2013.01); *G06T 2207/30016* (2013.01)

(58) Field of Classification Search
CPC . G06T 2207/10088; G06T 2207/30016; G06T 2207/10072; G06T 2207/20192;
(Continued)

(56) References Cited

U.S. PATENT DOCUMENTS 6,373,998 B2 * 4/2002 Thirion .................. G06T 3/0068
128/922
2007/0237372 A1 * 10/2007 Chen ..................... G06K 9/6203
382/128

(Continued)

FOREIGN PATENT DOCUMENTS

WO     2009/058915 A1    5/2009

OTHER PUBLICATIONS

"Image-guided regularization level set evolution for MR image segmentation and bias field correction."; Wang, Lingfeng; Pan, Chunhong; NLPR, Institute of Automation, Chinese Academy of Sciences, Beijing 100190, China; In Magnetic Resonance Imaging Jan. 2014 32(1):71-83.*

(Continued)

*Primary Examiner* — Michael S Osinski
(74) *Attorney, Agent, or Firm* — Medler Ferro Woodhouse & Mills PLLC

(57) ABSTRACT

Computer analysis of data sets representing images such as MRI images to achieve bias correction and image registration, each image including a bias in intensity within the image of unknown magnitude, is performed by: a) inputting a digital data set of a first image and a digital data set of a second image into a computer; b) calculating a deformation of said first image that transforms said first image into a transformed image that is an optimized approximation of said second image and c) simultaneously calculating and applying a bias correction which is applied to said first image and a bias correction which is applied to said transformed image and a bias correction which is applied to said trans- (Continued)

formed image such that each of the first image and the transformed image is individually corrected for bias therein. Generally, an average of the bias correction over the first image is equal and opposite to an average of the bias correction over said transformed image.

13 Claims, 4 Drawing Sheets

(58) Field of Classification Search
CPC . G06T 2207/20208; G06T 2207/30008; G06T 2207/30096; G06T 5/007; G06T 5/50; G06T 5/002–5/008; G06T 7/33; G06T 7/30; G06T 7/11; G06T 7/0012; G06T 7/0014; G06T 7/337; G06T 7/344; G06T 7/38; A61B 5/055; A61B 5/0037; A61B 5/004; A61B 5/1128; A61B 5/7246; A61B 2090/364; A61B 2090/374; G01R 33/5608; G01R 33/5616; G01R 33/565; G01R 33/56536; G01R 33/56545; G01R 33/56572; G06K 9/44
See application file for complete search history.

(56) References Cited

U.S. PATENT DOCUMENTS

| | | | | |
|---|---|---|---|---|
| 2007/0249928 | A1* | 10/2007 | Blezek | G01R 33/485 600/410 |
| 2008/0037865 | A1* | 2/2008 | Vetter | G06K 9/00986 382/168 |
| 2008/0112649 | A1* | 5/2008 | Chen | G06K 9/32 382/302 |
| 2008/0232714 | A1* | 9/2008 | Nord | G06T 7/33 382/284 |
| 2008/0292194 | A1* | 11/2008 | Schmidt | G06T 7/0012 382/217 |
| 2008/0294686 | A1* | 11/2008 | Long | G06F 17/30598 |
| 2009/0022385 | A1* | 1/2009 | Ritter | G01R 33/56518 382/131 |
| 2009/0108843 | A1* | 4/2009 | Koch | G01R 33/5616 324/309 |
| 2011/0305405 | A1* | 12/2011 | Kawamura | G06T 7/003 382/294 |
| 2012/0155734 | A1* | 6/2012 | Barratt | G06T 7/344 382/131 |
| 2013/0163896 | A1* | 6/2013 | Chen | G06T 3/0068 382/278 |
| 2013/0315448 | A1 | 11/2013 | Fletcher et al. | |
| 2014/0119595 | A1* | 5/2014 | Gallo | G06T 3/0081 382/103 |
| 2014/0254898 | A1* | 9/2014 | Wang | G06T 7/33 382/128 |
| 2015/0043794 | A1* | 2/2015 | Tahmasebi Maraghoosh | G06T 7/33 382/128 |
| 2015/0154756 | A1* | 6/2015 | Gerganov | G06T 7/32 382/131 |
| 2015/0289848 | A1* | 10/2015 | Hwang | A61B 5/1128 600/411 |
| 2015/0362575 | A1* | 12/2015 | Ourselin | G01R 33/56536 382/131 |
| 2016/0019680 | A1* | 1/2016 | Kabus | G06T 5/008 382/131 |
| 2016/0048961 | A1* | 2/2016 | Mohr | G06T 7/0024 382/131 |
| 2016/0143576 | A1* | 5/2016 | Symon | A61B 8/085 600/411 |
| 2016/0364847 | A1* | 12/2016 | Bouzaraa | G06T 5/007 |
| 2017/0178307 | A1* | 6/2017 | Yan | G06T 7/0016 |
| 2018/0144472 | A1* | 5/2018 | Kullberg | G06T 7/33 |

OTHER PUBLICATIONS

"Automated model-based bias field correction of MR images of the brain."; Van Leemput, K.; Maes, F.; Vandermeulen, D.; Suetens, P.; IEEE Transactions on Medical Imaging IEEE Trans. Med. Imaging Medical Imaging, IEEE Transactions on. 18(10):885-896 Oct. 1999.*

"Nonrigid Image Registration Using Conditional Mutual Information"; Dirk Loeckx; IEEE Transactions on Medical Imaging, vol. 29, No. 1, Jan. 2010 (Year: 2010).*

"Serial registration of intraoperative MR images of the brain"; Matthieu Ferrant; Medical Image Analysis 6 (2002) 337-359 (Year: 2002).*

"Mutual Information-Based CT-MR Brain Image Registration Using Generalized Partial Volume Joint Histogram Estimation"; Hua-mei Chen; IEEE Transactions on Medical Imaging, vol. 22, No. 9, Sep. 2003 (Year: 2003).*

"Evaluation of Optimization Methods for Nonrigid Medical Image Registration Using Mutual Information and B-Splines"; Stefan Klein; IEEE Transactions on Image Processing, vol. 16, No. 12, Dec. 2007 (Year: 2007).*

International Search Report and Written Opinion, dated Jan. 5, 2016 in PCT/EP2015/071248.

Jaber, Juntu et al., "Bias Field Correction for MRI Images", Computer Recognition Systems—Advances in Soft Computing, vol. 30, May 22, 2005, p. 543, XP055023554.

Maes, F. et al., "Medical Image Registration Using Mutual Information", Proceedings of the IEEE, IEEE. New York, US, vol. 91, No. 10, Oct. 2003, pp. 1699-1722, XP008056001.

Maintz, J B A et al., "Mutual-Information-Based Registration of Medical Images: A Survey", IEEE Transactions on Medical Imaging, IEEE Service Center, Piscataway, NJ, US, vol. 22, No. 8, Aug. 2003, pp. 986-1004, XP011099100.

Modat, Marc et al., "Nonrigid Registration with Differential Bias Correction Using Normalised Mutual Information", Biomedical Imaging: From Nano to Macro, 2010 IEEE, International Symposium on, IEEE, Piscataway, NJ, USA, Apr. 14, 2010, pp. 356-359, XP031693609.

Uro, Vovk et al., "A Review of Methods for Correction of Intensity Inhomogenetity in MRI", IEEE Transactions on Medical Imaging, IEEE Service Center, Piscataway, NJ, US, vol. 26, No. 3, Mar. 2007, pp. 405-421, XP011171979.

\* cited by examiner

BIAS CORRECTION IN IMAGES

The present invention relates to methods for the computer analysis of data sets representing images in order to correct for intensity bias of unknown magnitude within each image. The invention has particular, but not exclusive, relevance to processing MRI images.

Structural magnetic resonance imaging (MRI) is a non-invasive technique for examining the physical structure of the brain (for example, calculation of the volumes of tissue). This is of high value for monitoring neurodegenerative diseases such as dementia where it is well known that the brain shrinks as the disease evolves.

A common approach to measuring volume change is by use of image registration (a method that aligns two images by deforming one of the images). By analyzing how the image has to be deformed to match the other image, change in volume can be computed. In order to best analyze MRI scans, they need to be free of any artifacts. MRI scans are usually corrupted with noise from various factors arising from the scanner. These normally appear as smoothly varying intensities in the images, so called bias fields, which do not represent the human anatomy. Such bias fields can severely distort the analysis.

Computational anatomy tools such as image registration have been ubiquitous in characterizing the longitudinal variations in the human brain. One such application is utilizing the atrophy scores obtained from an image registration to infer statistical differences in different diagnostic groups such as Alzheimer's disease (AD) and normal controls (NC). In this context, tensor-based morphometry (TBM) has been widely used in clinical trials to estimate atrophy by analyzing the Jacobian determinant maps constructed from the obtained deformations [1]. However artifacts in images may alter atrophy measured from image registration and can subsequently hamper the power of a clinical trial [2]. A typical artifact seen in brain magnetic resonance imaging (MRI) scans is a smoothly and slowly changing spatial variation in image intensity, or bias, which is caused by factors such as radio frequency excitation field, magnetic field inhomogeneity, and non-uniform reception coil sensitivity [3].

Image uniformity can be improved by non-differential or differential bias correction methods. Among non-differential bias correction methods, the initial ones followed a prospective approach where bias was assumed to be systematic image acquisition errors [4]. An alternative and effective approach was to correct images after the acquisition using standard image processing tools [4]. The most popular method among the latter is nonparametric non-uniform intensity normalization (N3) method, which modeled bias as a smooth multiplicative field and acquired the bias by maximizing high frequency content of the image histogram [5].

Differential bias correction was first introduced in [2]. Based on the assumption that bias should have large-scale structure in the difference image of rigidly registered longitudinal MRI scans, unsharped bias was removed using median filter. A method extended this from two images to multiple images by using the geometric means of the pairwise differential bias [6]. However, because bias was estimated from scans after rigid registration, the methods also removed some true intensity variation, since differential bias from scans also included intensity difference due to atrophic tissue shifting [2]. It is likely that differential bias correction methods after nonrigid registration would perform better. Some works formulated the global transformation by multiplying a bias term to the mean of the serially aligned images [7], while others formulated the local transformation by multiplying the bias term to one image, either source image or target image [8-11].

However, the bias field affects both source and target images when recorded. If only bias in one image is corrected, the result of a (non-rigid) registration will depend on such common multiplicative field and thereby be affected by whether one or two images are bias corrected. In practice, this may be seen e.g. in the cerebellum—it often appears that this region of the brain is not correctly bias corrected in one of the images and opposite atrophy patterns in white matter and grey matter may appear [12]. The accuracy of the atrophy scores in presence on bias therefore becomes largely dependent on the choice of image on which the bias field is modeled.

There is a continuing need to develop better methods of correction of bias in images to allow better automated measurement of differences between the images that are not due to bias.

The present invention now provides a method of computer analysis of data sets representing images to achieve bias correction and image registration, each image including a bias in intensity within the image of unknown magnitude, the method comprising:

inputting a digital data set of a first image and a digital data set of a second image into a computer;

in said computer calculating a deformation of said first image that transforms said first image into a transformed image that is an optimised approximation of said second image and simultaneously calculating and applying a bias correction which is applied to said first image and a bias correction which is applied to said transformed image such that each of the first image and the transformed image is individually corrected for bias therein.

Preferably, an average of the bias correction over the first image is equal and opposite to an average of the bias correction over said transformed image either exactly or within a percentile sufficiently small to ensure that the sum of the averages is represented within the computers precision of floating point numbers.

Each said data set may represent an MRI image. Alternatively, each could relate to an image obtained by Computed Tomography, e.g. by X-ray, or by Nuclear Imaging such as PET or SPECT, microscopy images of e.g. histological slices.

Said MRI image may be of a brain or a part thereof.

Each said data set may represent an image of the same object from the same viewpoint obtained at spaced time points, for instance each may be an MRI of the brain of the same patient separated in time, e.g. by a year or more.

Alternatively, each said data set may represent an image of a different instance of the same type of object from the same viewpoint. For instance, the images may be a set of brain MRI images from different patients.

One said image may then adopted as fiducial and each of a pair of other said images is subjected to bias correction and registration with said fiducial image, whereby to better define the bias correction for said fiducial image.

Alternatively, multiple images may be bias corrected and registered to produce a new image which is a bias corrected centroid of the multiple images. This may be done by iterating an update of the centroid image applying first the average deformation obtained by registrations to the multiple images and secondly applying the average of the bias field obtained while registering to the multiple images. This process is continued until convergence is obtained as both the average registrations and average bias fields are negligible.

Optionally, simultaneous bias correction and said deformation calculation is conducted by optimising an objective function which comprises a term which is minimised when the images are optimally registered. This may be for instance Mutual Information or Normalised Mutual Information or cross correlation.

Preferably, said objective function further comprises a regularisation term which penalises deviation from linearity of calculated parameterised bias and deformation fields.

Preferably, said objective function further comprises a term constraining the average bias applied to each image to be essentially or exactly equal and opposite, as described above.

In a further aspect, said invention comprises a computer programmed to accept as input data sets representing images and to process said data sets to achieve bias correction and image registration, each image including a bias in intensity within the image of unknown magnitude, said processing in said computer comprising calculating a deformation of said first image that transforms said first image into a transformed image that is an optimised approximation of said second image and simultaneously calculating and applying a bias correction which is applied to said first image and a bias correction which is applied to said transformed image such that each of the first image and the transformed image is individually corrected for bias therein.

From the bias corrected and registered images an estimate of change of size of said object between said time points may be obtained. Where the images are time separated brain images, such a measure of atrophy may be of diagnostic significance in detecting Alzheimer's disease or in forecasting its onset.

Differential bias correction is an important tool when simultaneous assessments of longitudinal scans are made. Among the existing methods, the bias model is applied to only one of the images. This may lead to inconsistent atrophy estimation depending on which image it is applied to. In preferred embodiments of this invention, we use a B-spline free-form deformation based two-image differential bias correction method where both images in the registration process are corrected for bias simultaneously. Further, symmetry in bias correction is achieved via a new regularization term. In a simulated experiment, described below reproducibility of atrophy measurements in a single-image bias correction method largely depended on the choice of the image that was corrected while this choice did not matter with the two-image bias correction method of the invention. On Alzheimer's disease neuroimaging initiative data, the two-image bias correction method performed b when compared to registration of separately bias corrected images.

The invention will be further described and illustrated by the following description of preferred embodiments with reference to the accompanying drawings in which.

Figure 1:
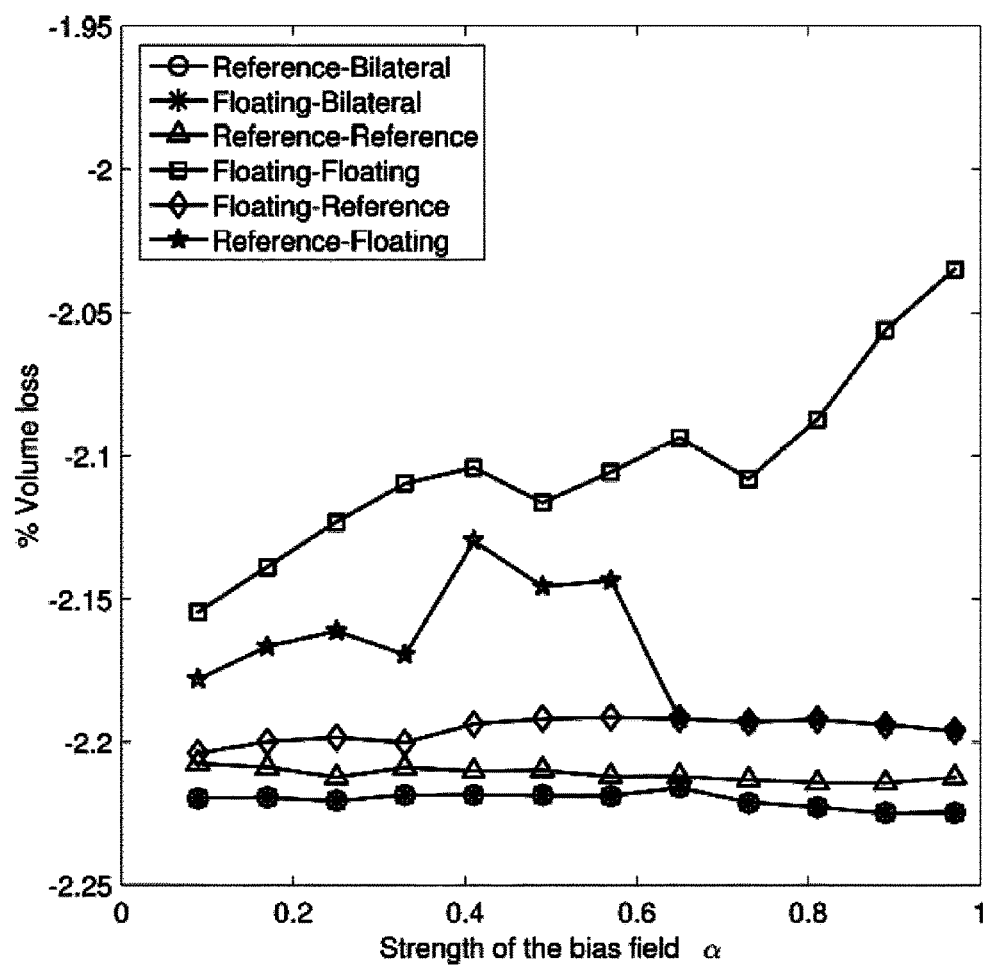
FIG. 1 is a graph that shows results obtained on whole brain images in an evaluation of the invention described below.

In image registration, the difference between the images due to bias fields can be accounted for as an integral part of the alignment process. Existing registration tools do this by trying to account for the bias field in one of the images and evolving the other image to the same intensity level as the uncorrected image.

However, this approach is asymmetric, because it matters which image is selected as the one where bias is accounted for. Moreover, the real bias field is not necessarily removed, only the intensities are changed to match in the two images. It is therefore possible to add bias to the uncorrected image instead of removing bias from the evolving image.

The present invention aims at correcting both images simultaneously during the registration procedure. The proposed method involves assuming two bias fields, one in each image. During the registration optimization, the images are aligned after accounting for the above-mentioned bias fields. In order to be consistent with both the images it is preferred to enforce that an at least essentially equal amount of bias correction is done in both images. This criterion may be adequately met if the correction applied to one image is of same order of magnitude as the correction applied to the transformed image, so that the sum of their averages is well represented within the computers precision of floating point numbers.

In a preferred methodology according to the invention, applied to measuring atrophy in brain MRI images separated in time, in order to remove a dependency of atrophy scores on which image is bias corrected, we propose a B-spline free-form deformation based two-image differential bias correction method where both images in a registration process are corrected for bias simultaneously. Both the images are treated with independent bias models; however, the models are consistently applied through a regularization term. The method may be directly applied to any gradient descent based non-rigid registration method.

In the following, Scalars are normal typeface. Vectors are boldface. Spatial coordinates are given by x=(x,y,z)

Given two images, image registration tries to find a transformation T that best maps point in the floating image to the corresponding point in the reference image. In this embodiment, the transformation is a combination of a global transformation and a local transformation. The global transformation model is a rigid registration using 6 degrees of freedom. Following the rigid registration is a refinement using non-rigid registration where the transformations are modeled using free-form deformation framework (FFD) [13]. FFD consists of three components: a deformation model, an objective function and an optimization scheme.

Combined Deformations and Bias Model

In geometric deformation model, a cubic B-spline interpolation scheme is used as in [13]. We manipulate a mesh of geometric control points $p_{ijk}$ overlaid on the image, with spacing $\delta_x^p$, $\delta_y^p$, and $\delta_z^p$ respectively along the x-, y-, and z-axis, to represent the image.

Bias fields are modeled on image intensity by multiplying a scalar exponential term to both the reference image and deformed floating image. Here the exponential terms are used, since they are positive and the derivatives are simple and cheap to compute. B-spline basic function is used for image intensity interpolation.

To define the bias model, we denote the domain of the 3D brain MRI scan as $$V=\{(x,y,z)|0 \leq x \leq X,\ 0 \leq y \leq Y,\ 0 \leq z \leq Z\}.$$

The multiplied bias fields to the reference image R and deformed floating image F (T) are defined as $e^{B_R}$ and $e^{B_F}(T)$ Let $b_{lmn}$ and $b_{def}$ be the mesh of control points overlaid on R and F (T), with spacing $\delta_x^{b_R}$, $\delta_y^{b_R}$, $\delta_z^{b_R}$ and $\delta_x^{b_F}$, $\delta_y^{b_F}$, $\delta_z^{b_F}$ respectively, then $B_R$ and $B_F$ (T) field for each voxel (x, y, z) can be computed as $$B_R(x) = \sum_{l,m,n} \beta^3\left(\frac{x}{\delta_x^{b_R}} - l\right)\beta^3\left(\frac{y}{\delta_y^{b_R}} - m\right)\beta^3\left(\frac{z}{\delta_z^{b_R}} - n\right)b_{lmn} \quad (1)$$

$$B_F(T(x)) = \sum_{d,e,f} \beta^3\left(\frac{T_x(x)}{\delta_x^{b_F}} - d\right)\beta^3\left(\frac{T_y(y)}{\delta_y^{b_F}} - e\right)\beta^3\left(\frac{T_z(z)}{\delta_z^{b_F}} - f\right)b_{def} \quad (2)$$

where $\beta^3$ is the cubic B-spline basis function, l, m, n and d, e, f are control point indexes along x-, y-, and z-axes respectively for two images in V and T(x)=(Tx(x), Ty(x), Tz(x)).

Equation (1) gives the value of the bias field in the position x (real valued, not necessarily integer valued). It is given as a super position of 3-dimensional $3^{rd}$ order b-spline basis functions computed as the product of one-dimensional b-splines ($\beta^3(x)$ times $\beta^3(y)$ times $\beta^3(z)$) centered in the coordinates l,m,n in the three dimensions (x,y,z)=x, weighted by the scalar $b_{lmn}$. The functions $\beta^3$ is a convenient choice of functions (third order b-splines) from the literature. $b_{lmn}$ are parameters. The bias field is used to create a bias-corrected image $$R_{corrected}(x) = R(x)\exp(B_R(x))$$

The problem is to determine the bias field: determining the parameters $b_{lmn}$ (and the parameters $b_{def}$ and $p_{ijk}$ introduced later).

Equation (2) is identical to (1) except that it parameterizes the bias field of the floating image which is moved from x to T(x) according to a transformation T: $R^3 \to R^3$ that maps three-dimensional space to three-dimensional space. Now, a corrected floating image is $$F_{corrected}(T(x)) = F(T(x))\exp(B_F(T(x)))$$

If this holds it trivially follows that also the following holds $$F_{corrected}(X) = F(x)\exp(B_F(x))$$

Hence, by using $B_F(T(x))$, and applying this to the transformed floating image $F(T(x))$, one implicitly applies the bias field $\exp(B_F(x))$ to the untransformed floating image. Hence the bias field acts in a coordinate system attached to the scanner (untransformed) and not attached to the patient (transformed). This is physically more realistic, as bias fields originate more from scanner artefacts than patient artefacts.

Objective Function

Deformation model parameter $p_{ijk}$, bias field parameters for reference image $b_{lmn}$ and deformed image $b_{def}$ are used as parameters to optimize the objective function (3) which is a combination of normalized mutual information (NMI) term, regularization term and symmetry term. The NMI term is used as the similarity criterion to measure the alignment between two images, the regularization term is used to smooth the deformation, and symmetry term is used to achieve symmetry.

$$C = -NMI + R + \gamma S \quad (3)$$

Equation (3) is the overall penalty function to minimize in order to solve the problem (i.e., estimating warp and bias fields simultaneously). It consists of three terms weighted against each other. C is a function of all deformation field parameters $p_{ijk}$ and all bias field parameters $b_{def}$ and $b_{lmn}$. NMI and R are dependent on all parameters whereas S depends on the bias field parameters $b_{def}$ and $b_{lmn}$ only. The parameters obtaining the minimal value of C, would not change if C had been multiplied by a constant. Hence, a weighting parameter on NMI has been omitted as only the relative weighting of NMI, R, and S is of importance.

The regularization term R is based on the discrete Laplacian in the geometric deformation controls points and bias field control points [14] and is given by $$R = \lambda_P \sum_{i,j,k} |\Delta p_{ijk}|^2 + \lambda_B \sum_{l,m,n} |\Delta b_{lmn}|^2 + \lambda_B \sum_{d,e,f} |\Delta b_{def}|^2 \quad (4)$$

Equation (4) is the regularization term of (3). It is the sum of the regularization of the three b-spline parameterized deformation and bias fields. It is implemented as terms trying to keep the fields as close as possible to linear functions by penalizing differences to a linear function. The operator "Δ" denotes the discrete laplacian so that $$\Delta b_{lmn} = \frac{1}{6}(6 \ast b_{lmn} - b_{l-1mn} - b_{l+1mn} - b - b_{lm-1n} - b_{lm+1n} - b_{lmn-1} - b_{lmn+1})$$

This is $b_{lmn}$ from which is subtracted the average of its 6 neighbours in 3 dimensions. Making this close to zero (by penalizing its square) in all points enforces the b values to be close to a linear function of its indices. The special linear case ($b_{lmn} = a \ast l + b \ast m + c \ast n + d$) has a zero discrete laplacian (Δ $b_{lmn} = 0$). Hence, the $b_{lmn}$ cannot vary wildly, but must stay relatively close to a function like $a \ast l + b \ast m + c \ast n + d$. The first term of (4) could more stringently have been written using $$\Delta p_{ijk} = (\Delta p^x_{ijk}, \Delta p^y_{ijk}, \Delta p^z_{ijk})$$

using the fact that $p = (p^x, p^y, p^z)$ and $|\Delta p_{ijk}|^2 = \Delta p^x_{ijk}\Delta p^x_{ijk} + \Delta p^y_{ijk}\Delta p^y_{ijk} + \Delta p^z_{ijk}\Delta p^z_{ijk}$ showing that the regularization of the transformation T(x) is sought to be close to a linear function in the three coordinate functions independently.

Bias field intensity value could go to zero or infinity, to avoid this the symmetry term is proposed $$S = \left(\sum_{x \in V} \ln(e^{B_R(x)}) + \ln(e^{B_F(T(x))})\right)^2 \quad (5)$$

Equation (5) expresses the preference for the average log-bias-field in reference and floating image to sum up to zero. That is, they should on average be equally large with opposite signs although locally within the registered images the sum of the bias fields may not be zero. This can be obtained by adding a constant to both all $b_{lmn}$ and $b_{def}$. This does not influence R and NMI as they are invariant to such constants multiplications of the images. Hence, this term S will in the minimum always be identical to zero and the symmetry exactly fulfilled. The purpose of ensuring that the two bias fields are equally large with opposite signs, is to ensure that, we do not, in the minimum identified by gradient descent, add a very large positive or negative constant to both log-bias-fields. If we added or subtracted such constants, we maybe put some numerical imprecision into the system.

The NMI term which measures the amount of information that two images share using entropies [15], is formulated as $$NMI = \frac{H(e^{B_R} \times R) + H(e^{B_F(T)} \times F(T))}{H(e^{B_R} \times R, e^{B_F(T)} \times F(T))} \quad (6)$$

where the numerator of (6) is the sum of marginal entropies of two images, and the denominator of (6) is the joint entropy of two images.

Equation (6) expresses the "Normalized Mutual Information" (NMI). This is a variant of the Mutual Information MI. Assume two random variables X, Y, then the MI(X,Y)=H(X)+H(Y)−H(X,Y), where H( ) is the entropy of a random variable. The more uniform a distribution is, the larger is the entropy. For image registration we wish to maximize the mutual information of the intensity in the two images taken in corresponding positions. That is, assuming that H(X) and H(Y), the entropy of the intensity distribution in the two images, does not vary with how the images are registered, the MI-based registration will minimize H(X,Y), that is to make the joint distribution of the corresponding intensities as non-uniform as possible. That is, it wants the joint histogram of the two images to be placing the intensities in as few bins as possible. This is assumed to be obtained if corresponding points are images of the same physical point. From a source coding perspective, the MI tells how many bits of information X tells about Y (or vice versa). That is: if one wishes to encode an intensity from one image, how many bits may one on average save, if one already knows the corresponding intensity in the other image.

The Normalized Mutual Information is defined as $$NMI=(H(x)+H(Y))/H(X,Y).$$

This has been published as a way to handle the problem that images are of finite extent, and thereby there may be a tendency using MI to have only few overlapping points in the images. In this situation MI can, due to the low number of samples, become artificially high. NMI may be seen as a hack without root in information theory, but it is applied in practice with great success.

For the purpose of the invention it is not expected that it makes a major difference if MI or NMI is used. Indeed, instead of NMI, any data term that is obtains its minimal value when images are optimally registered may be used. MI and NMI are especially preferred as they are not just maximizing H(X,Y), but also simultaneously trying to minimize H(X) and H(Y).

Minimizing the histogram entropy is another well-known methodology to perform bias correction of a single image.

Also, instead of NMI, the data term may be the cross-correlation:

$$CC(R,F)=\int R(x)F(T(x))dx/[\text{sqrt}(\int R^2(x)dx)\text{sqrt}(\int F^2(T(x))dx)]$$

In order to compute the marginal and joint entropy in (6), an approach using parzen windows [16] is used. Denote the index of the histogram bins as $\kappa$ and $\iota$, the joint histogram is $$p(l, \kappa \mid p_{ijk}, b_{lmn}, b_{def}) = \alpha \sum_{x \in V} \beta^{(3)}\left(\kappa - \frac{e^{B_R(x)} \times R(x) - R_o}{\Delta b_R}\right) \times \beta^{(3)}\left(l - \frac{e^{B_F(T(x))} \times F(T(x)) - F^o}{\Delta b_F}\right) \quad (7)$$

here $\alpha$ is the normalization factor, $R^o$ and $F^o$ are the minimum intensity value of two images, and $\Delta b_R$ and $\Delta b_F$ are the intensity range of each bin. The corresponding marginal histograms can be obtained by integrating (7).

Equation (7) shows how in this embodiment in practice is obtained the joint histogram (here denoted p, n.b. this has nothing to do with the transformation control points $p_{ijk}$, but is used as it is assumed to have something to do with a joint distribution of intensities) of two images with correspondence defined by $p_{ijk}$ and bias correction defined by $b_{lmn}$ and $b_{def}$. After bias-correction, image intensities are not any longer integer values, and a discrete histogram is not expedient to use due to one effect: there is truncation error when an intensity is put into bins. This makes the MI as a function of bias-correction a piecewise constant function separated by jumps in value when the change of bias correction make a pixel jump to a neighboring bin in the histogram. This makes gradient-based optimization impossible. Instead, a b-spline, $\beta^3$ is centered in each floating point intensity and represents the joint histogram (This b-spline is the same mathematical function, but should not be confused with the basis-functions used for the bias fields or the deformation field.). This has the advantage that the histogram p becomes a differentiable function in the parameters $p_{ijk}$, $b_{lmn}$ and $b_{def}$. Thereby also NMI (or MI) becomes differentiable in the parameters, and a gradient-based optimization methodology may be used.

Optimization Scheme

The limited memory Broyden-Fletcher-Goldfarb-Shanno (L-BFGS) algorithm [17] is used to optimize the objective function. In order to proceed the optimization, we need to compute the derivative of the objective function (3) with respect to $p_{ijk}$, $b_{lmn}$, and $b_{def}$. To proceed optimization, the derivatives of joint and marginal entropies and histograms have to be evaluated. The derivative of (7) with respect to $p_{ijk}$ can be computed as:

$$\frac{\partial p(l, \kappa \mid p_{ijk}, b_{lmn}, b_{def})}{\partial p_{ijk}} = \alpha \sum_{x \in V} \beta^{(3)}\left(\kappa - \frac{e^{B_R(x)} \times R(x) - R^o}{\Delta b_R}\right) \times \left.\frac{\partial \beta^{(3)}(\xi)}{\partial \xi}\right|_{\xi = l - \frac{e^{B_F(T(x))} \times F(T(x)) - F^o}{\Delta b_F}} \times \left(\frac{-\partial(e^{B_F(t)} \times F(t))}{\partial t}\bigg|_{t=T(x)}\right)^T \frac{\partial T(x)}{\partial p_{ijk}} \quad (8)$$

The derivative of (7) with respect to $b_{lmn}$ can be computed as:

$$\frac{\partial p(l, \kappa \mid p_{ijk}, b_{lmn}, b_{def})}{\partial b_{lmn}} = \quad (9)$$

$$\alpha \sum_{x \in V} \left.\frac{\partial \beta^{(3)}(\xi)}{\partial \xi}\right|_{\xi = \kappa - \frac{e^{B_R(x)} \times R(x) - R^o}{\Delta b_R}} \times (-e^{B_R(x)} \times R(x))$$

$$\frac{\partial B_R(x)}{\partial b_{lmn}} \times \beta^{(3)}\left(l - \frac{e^{B_F(T(x))} \times F(T(x)) - F^o}{\Delta b_F}\right)$$

The derivative of (7) with respect to $b_{def}$ can be computed as:

$$\frac{\partial p(l, \kappa \mid p_{ijk}, b_{lmn}, b_{def})}{\partial b_{def}} = \alpha \sum_{x \in V} \beta^{(3)}\left(\kappa - \frac{e^{B_R(x)} \times R(x) - R^o}{\Delta b_R}\right) \times \quad (10)$$

$$\left.\frac{\partial \beta^{(3)}(\xi)}{\partial \xi}\right|_{\xi = l - \frac{e^{B_F(T(x))} \times F(T(x)) - F^o}{\Delta b_F}} \times$$

-continued $$(-e^{B_F(t(x))} \times F(T(x))) \frac{\partial B_F(T(x))}{\partial b_{def}}$$

The choice of adding the bias correction term before or after transformation in the floating image is a matter of choice. We chose to multiply the correction term after the transformation in order not to interfere with the spatial deformation model. However, this choice is not expected to have a significant influence on the final registration.

Equations (8, 9, 10) give the derivative of (7) with respect to the parameters $p_{ijk}$, $b_{lmn}$ and $b_{def}$ respectively. The derivatives of (3) are assumed to be easy to find when these are given. $\partial C/\partial q$ (where q here could be any parameter) is $$\partial C/\partial q = \partial NMI/\partial q + \lambda \partial R/\partial q + \gamma \partial S/\partial q$$

$$\partial NMI/\partial q = [(\partial H(X)/\partial q + \partial H(Y)/\partial q)H(X,Y) - \partial H(X,Y)/\partial q (H(X)+H(Y))]/H(X,Y)^2$$

and as $H(X)=-\int p(x)\log p(x)dx$ we find after some algebra $\partial H(X)/\partial q=-\int \partial p(x)/\partial q (\log p(x)+1)dx$ Similar equations hold for H(Y) and H(X,Y) and the derivatives of R and S are quite trivial to find as they are simple sums of squares or squares of sums.

Parameters

Three levels and five levels of transformations were used respectively in rigid and non-rigid registration. Levels and evaluation point settings were similar to [14]. Different Gaussian blurrings were applied to the images at different levels of registration (kernel sizes of 15, 8, 2 mm for the three levels of rigid registration and 2.0, 1.5, 0.5, 0.2, 0.2 mm for the five levels of non-rigid registration). The regularization parameter λ and symmetry term parameter γ were empirically chosen as 0.03.

Cube Propagation

In order to evaluate the performance of registration, cerebral atrophy in serial MRI scans were estimated. Since the transformations were a composition of B-splines, cube propagation [14] was used to compute local volume changes.

Usually, given a deformation field and an anatomical mask, regional atrophy is estimated by summing the Jacobian determinant over the region of interest (ROI). However, for registration schemes where the analytical expression of the transformation is not available, the Jacobean determinant needs to be approximated using finite differencing schemes [14a]. We instead utilize Cube Propagation (CP) to measure atrophy. Here, each face of a cubic voxel is triangulated and the volume under each triangle after transformation is summed to get the volume of the transformed cube. Tetrahedral meshing is also similar in terms of both numerical precision and meshing, however with CP one needs to only triangulate the surface which is simpler in terms of bookkeeping of the indices and computations. A detailed description of CP can be found in [31a]. Thus, cube propagation is used here to avoid numerical noise in the deformation being amplified by using Jacobian integration.

Alternative Registration Methods

Registration methods other than that described above may be used whilst applying the simultaneous differential bias correction described herein in the same way. For instance, instead of utilising B-splines, one may use parameterization of stationary velocity fields for diffeomorphic registration using a class of multi-scale, multi-shape regularizing kernels called the Wendland kernels. This registration scheme is here termed wKB-SVF. We propose a framework that incorporates the best characteristics of state-of-art registration schemes: 1) we restrict the space of velocity fields to a specific class of function spaces, reproducing kernel Hilbert spaces (RKHS) [1a], [2a], [3a], [4a], [5a], [6a]; 2) we parameterize the velocity fields using compactly supported reproducing kernels inherited from the RKHS structure, and we subsequently represent the high dimensional ODE via a smaller set of control points and vectors [7a], [8a]; 3) we provide a multi-scale representation of the velocity fields using the kernel bundle framework [9a].

In the absence of validated models for inter-subject/intra-subject anatomical variability, deformations characterizing anatomical changes such as change in organ growth are generally assumed to be smooth and invertible. Three popular choices of diffeomorphic deformation models are: a) Large deformation diffeomorphic metric mapping (LDDMM), b) freeform deformations and c) stationary velocity fields (SVFs). Among them, a) and c) naturally generate diffeomorphisms and b) requires explicit regularization terms to ensure diffeomorphic transformations. For a discussion about commonly used constraints on deformation models see [10a].

Each of these methods involves finding an optimal diffeomorphism that connects two images. SVFs are less computationally expensive compared to LDDMM due to the constant velocity field assumption. Here we use SVFs together with some key concepts from LDDMM because SVFs satisfy the dual goal of generating diffeomorphisms while keeping computational complexity low. A key feature of LDDMM is that the velocity fields are modelled on a Hilbert space. This space can be constructed using reproducing kernels, and this approach allows optimal solutions to specific optimization problems to be found as linear combinations of the reproducing kernels. We model the stationary velocity fields on a Hilbert space constructed using a class of reproducing kernels called Wendland kernels. A key property of Wendland kernels is that they are of compact support. The construction reduces computational complexity because both the deformation field and the regularization term evaluate to zero outside the support of the kernel [6a]. Existing parametric versions of SVFs [7a], [8a] use kernels where the evaluation of the energy term often requires spatial discretization (bending energy for instance); Wendland kernels require no such spatial regularization. In addition, we will use these kernels in a kernel bundle framework to provide a multi-scale modelling of the deformation field. Using the multi-scale feature from the kernel bundle framework allows us to express the combination of various scales as a simple sum while still remaining in the Hilbert space.

Figure 3:
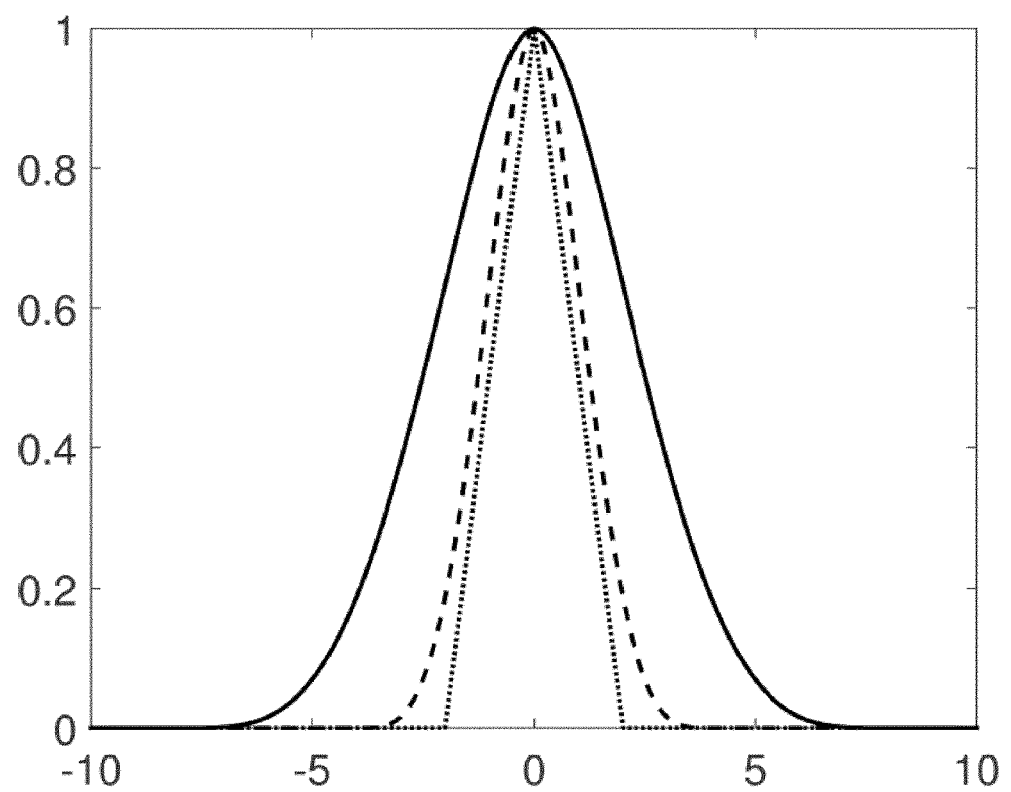
FIG. 3 shows a graphical representation of a 1-D Wendland kernel of different scales and orders.

FIG. 3 illustrates the orders of kernels that through the bundle construction can be used simultaneously in wKB-SVF. In addition, the proposed framework allows the flexibility to simultaneously optimize for scales like in the LDDMM based kernel bundle framework [9a].

In terms of performance, wKB-SVF provides better overlaps than the registration methods considered in the study [11a] on the publicly available MGH10 dataset. On the CUMC12 dataset, this method provides significantly better overlaps than most of the registration methods except for SPMDARTEL where the difference is insignificant. The framework also separates diagnostic groups of Alzheimer's disease (AD) and normal controls (NC) better than the Freesurfer longitudinal segmentations when used to compute longitudinal atrophy scores. The results illustrate that the wKB-SVF is well suited for both inter- and intra-subject registration.

In flow-based registration schemes, deformations are generated by integrating a smooth velocity field over time. Two prominent flow-based image registration frameworks are the LDDMM (time-varying ODEs) [2a] and SVF (time-constant ODEs) [12a], [13a]. In LDDMM, the deformations can be parametrized by initial velocity fields (or their dual, momenta) and the resulting diffeomorphism paths are endpoints of the corresponding Riemannian geodesics. This particular setting is computationally expensive since it involves solving a geodesic equation on an infinite dimensional group. An alternative to LDDMM are the SVFs. Here, the diffeomorphisms are one parameter subgroups parametrized by time-constant velocity fields through the Lie group exponential. The Lie group exponential is realized as a time-integration of the velocity field. The time integration is usually approximated using integration schemes such as Euler's or scaling-and-squaring [12a]. The generated diffeomorphism paths are geodesics with respect to the canonical Cartan connections [14a]. The main drawback of SVFs is the lack of metric on space of diffeomorphisms which is important for performing statistics such as PCA [15a] or regression [16a]. SVFs were initially proposed by [12a] and were further utilized with modifications in [17a], [7a], [8a], [13a], [14a]. Among these, [17a], [13a], [14a], [18a] use the entire image space for dissimilarity minimization. In studies [7a], [8a], the velocity fields are instead parameterized by interpolating kernels like b-splines. A thorough overview on existing registration schemes can be found in the study [10a], [11a]. Here we will restrict our focus to flow-based registration schemes and specifically to the parameterization of the stationary velocity fields (SVF).

In both SVF and LDDMM, the vector fields belong to a subspace V of square integrable functions, $\mathcal{L}^2$. The subspace V is generally completed using a Hilbert norm induced by a differential operator [19a]. With sufficient conditions on the operator, the space is a reproducing kernel Hilbert space (RKHS) [20a]: the Riesz representation theorem states that every linear form arises as an inner product with the representer. The representer is the reproducing kernel. A linear form is an evaluational functional that provides a mapping of a vector to $\mathbb{R}$. In case of finite dimensional optimization problems, RKHSs allow evaluation of the optimal space in terms of the reproducing kernel itself: for instance, for an interpolation problem defined as to find v∈V of minimum norm that satisfies $v(x_i) \approx \beta_i$, $\beta_i \in \mathbb{R}$, the solution can be expressed as the regularized optimization problem (Ref. theorem 9.7 [20a]), $\|v\|_V^2 + c\Sigma_1^D |v(x_i) - i|^2$. The solution then attains the form, $\hat{v} = \Sigma_1^D K(x,x_i)\alpha_i$. Here K is the reproducing kernel. The whole problem is thus reformulated to a finite dimensional optimization problem involving only the vectors $\alpha_i$.

In contrast to the most common approach, we will take advantage in the fact that there is flexibility in choosing reproducing kernels directly as opposed to being imposed by an operator. This approach allows us to minimize computation through the use of compactly supported kernels. Alternate options to parameterizing velocity fields are by either using B-Splines or truncated Gaussians. The latter is no longer continuous and the evaluation of the energy term of the former (like bending energy) is an approximation since it depends on spatial discretization. Wendland kernels [21a] (the choice of reproducing kernels used here) on the other hand emulate B-splines in both computational complexity and smoothness. In addition, they also provide the necessary mathematical properties (smooth, $C^k$ for some k, norm-minimizing) to realize a diffeomorphic transformation model. The role of reproducing kernels and the corresponding regularization in the context of LDDMM has been explored in [9a], [6a], [3a].

Inter-subject registration often requires smooth yet large deformations, whereas intra-subject registration requires deformations at much smaller scales. For example, anatomical changes in the hippocampus are often minute and changes in ventricles (cerebrospinal fluid) may require large deformations. It is desired that such deformations are recovered using the same transformation model. The type of the resulting deformation is restricted by the scale of the parameterizing kernel. Scale, in this case, can be interpreted as either the support of the kernel or the spacing between the control points. If the scale of the kernel is large, then matching of the larger structure may be good and the transformations smooth. However, the matching of smaller structures like the hippocampus may not be satisfactory. On the other hand, if the scale is small, the matching may be good but the resulting transformation is spiky and may lead to undesirably large Jacobians [3a]. One way to handle such variability in deformation scales (also to avoid local minima's in optimization) is via a pyramidal approach i.e., by changing the scales of image smoothing or the resolution of the control points. This approach, however, is still limited by the range of deformations achievable by the shape and size of the kernel. The kernel bundle framework handles this by providing a scale-space representation of the kernels. A very attractive feature of the kernel bundle framework is that the representation of the multi-scale kernel is a simple linear combination of kernels of different support or resolution. Standard parameterizations of velocity fields like ones using B-Splines require additional routines such as knot splitting to combine various scales of the velocity field. The idea of exploiting RKHS kernels to build multiscale kernel based diffeomorphic image registration is not new in the context of LDDMM [9a], [3a]. However, the application of kernel bundle framework in the context of SVF based image registration is believed to be novel. Further, a combination of compactly supported reproducing kernels and the kernel bundle framework has not been explored in diffeomorphic image registration.

We start by describing SVF based image registration and presenting the application of RKHSs in the context of SVFs. We then discuss how computational complexity can be minimized by representing velocity fields with compactly supported reproducing kernels. Followed by this, we discuss the adaptation of the kernel bundle framework to SVFs together with compactly supported Wendland kernels.

Given a floating image $I_1$ and a reference image $I_2$ with a spatial domain $\Omega \in \mathbb{R}^d$, image registration involves finding a transformation $\varphi:\Omega \times \mathbb{R} \to \Omega$ that aligns the images. The transformation is found by minimizing a dissimilarity measure between the images under certain constraints encoded in a regularization term. A general cost function is of the form:

$$\arg \min_{\varphi}(E(I_1, I_2)) = \arg \min_{\varphi} \ E_D(I_1(\varphi), I_2) + \lambda E_R(\varphi) + \lambda_{ICC} E_{ICC}(\varphi) \quad (1a)$$

where $\lambda$, $\lambda_{ICC}$ are user-specified constants controlling the degree of regularization, $E_D$ is a dissimilarity measure that allows comparison of the floating image to the reference image, $E_R$ is a regularization term that encodes desired properties of $\varphi$, and $E_{ICC}$ can be included as an additional penalty term to enforce inverse consistency, see discussion of Equation 6a. The regularization term can either be explicitly minimized as in the parametric approach or can be implicitly restricted by convolving with a low pass filter [13a]. The transformation now is restricted to the group of diffeomorphisms Diff($\Omega$) In flow-based schemes, a time-dependent velocity field $v(x,t):\Omega \times \mathbb{R} \to \mathbb{R}^d$ is integrated to obtain a displacement. The governing differential equation is of the form $$\frac{\partial \varphi(x,t)}{\partial t} = v(\varphi(x,t),t), \varphi(x,0) = x$$

where $\varphi$ is the displacement and $\int_0^T \|v(x,t)\|_{1,\infty} dt < \infty$ where [0,T] is the time interval. The path of diffeomorphisms $\varphi(\cdot,t)$ is in practice obtained by numerical integration. Solving the non-time stationary differential equation is generally computationally expensive.

With stationary velocity fields (SVF) [14a], the velocity field $v(x,t)$ is constant in time. The paths parameterized by SVFs are exactly one parameter subgroups of Diff($\Omega$) These paths are quite different from the Riemannian geodesics in the sense that the paths are metric-free [14a]. Let $\Omega$ be the spatial domain of $I_1$ with $x \in \Omega$ as a spatial location. Let $G \subset \text{Diff}(\Omega)$ be a subspace containing the diffeomorphic transformations, and let V be the tangent space of G at identity Id containing the velocity fields v. A path of diffeomorphisms is generated by the stationary flow equation, $$\frac{\partial \varphi(x,t)}{\partial t} = v(\varphi(x,t)) \quad (2a)$$

with initial condition $\varphi(x,0)=x$. The final transformation $\varphi(x)=\varphi(x,1)$ is the Lie group exponential map Exp(v). This Lie group exponential can be approximated by Euler integration [7a]. For example, given p steps and $\varphi^t=\varphi(x,t)$, the Euler integration is $$\varphi^0 = x, \quad (3a)$$

$$\varphi^{\frac{1}{p}} = x + \frac{v(x)}{p}, \quad (4a)$$

$$\varphi^{t+\frac{1}{p}} = \varphi^t \circ \varphi^{\frac{1}{p}}. \quad (5a)$$

In the study [12a], the scaling-and-squaring method to exponentiate velocity fields was proposed. Here the final deformation was estimated by composing successive exponentials. However, a major drawback to this method is that at every squaring step the velocity fields need to be re-interpolated at integer positions. This may lead to undesired smoothing (interpolation) in the velocity field over which there is no apparent control. Bossa et. al., [23a] point out the instability in the convergence properties of scaling-and-squaring. Therefore, we choose the relatively stable forward Euler's scheme for integrating the velocity fields.

In a continuous setting, diffeomorphisms generated by SVFs are invertible transformations with differentiable inverses. However, due to the numerical integration of the velocity field, inverse consistency is not achieved in practice and needs to be explicitly enforced typically through a regularization term. In [24a], inverse consistency was enforced by penalizing the displacement error generated after composing a transformation with its inverse. However, in this method, the computation of the inverse is a computationally expensive approximation [25a]. Forward transformations are first computed and then the inverse transformations are approximated. We will maintain a single parameterization of the velocity field. Both the forward and backward registration are performed simultaneously. The inverse consistency term is computed as, $$E_{ICC} = \|\varphi'(\varphi(x)) - x\|_2. \quad (6a)$$

where $\varphi = \varphi(x,1) = \text{Exp}(v)$ and $\varphi' = \text{Exp}(-v)$ are the backward and forward registration transformations.

In this section, we present multi-scale parametrization of velocity fields using compactly supported reproducing kernels. Similar to representations with non-reproducing kernels such as B-splines, the kernels have compact support but unlike B-splines, the reproducing property of the reproducing kernels ensure that the kernels are norm-minimizing.

In SVF based image registration, the velocity fields v, are chosen to belong to a subspace of absolutely integrable functions in $\mathcal{L}^2$. To complete this subspace, the norm associated with an appropriate differential operator L, $<u, v>_V = <Lu, v>_{\mathcal{L}^2}$, u, v$\in$V is utilized. Usually, L is chosen to be a diffusive model of the form $L = \text{Id} - \alpha \nabla^2$ [19] where $\nabla^2$ is a Laplacian operator. Other choices for the operator exist and discussion on them can be found in [26a].

The operator L provides a mapping of the velocity field v from V to its dual space V*. When V is admissible [20a], the dual space contains linear evaluational functionals $\delta_x : v \to v(x)$. The evaluation functionals, that for each $x \in \Omega$ provide a mapping of the vector space to $\mathbb{R}$, can be written as $(\delta_x | v) = v(x)$. According to the Riesz representation theorem, there exists spatially dependent kernels $K_x = K(\cdot, x) : \Omega \times \Omega \to \mathbb{R}^{d \times d}$ such that $v(x) = (K_x, v)_V = (\delta_x | v)$. This implies that $<K_x, v>_V = (LK_x | v)$ and $LK_x = \delta_x$ [20a]. Note that $\langle \cdot, \cdot \rangle$ denotes the inner product and $(\cdot | \cdot)$ denotes evaluation of a functional functional i.e., $(\delta | v) = \delta(v)$ where $\delta \in V^*$ and $v \in V$. We can therefore view K as an inverse of L. In fact, the kernel is also a Green's function with respect to the differential operator L. If the operator is differential, then K is positive definite. As a consequence, if K is constructed from a differential operator, then K is always of infinite support [27a]. It may be computationally intensive to evaluate the deformation field and the norm if velocity fields are parameterized using kernels of infinite support.

The approach in the previous section essentially involves first finding a mapping from V to V*, and then constructing kernels that provide a mapping back to V. We will use the significant benefits in taking the reverse approach: instead of constructing kernels from differential operators which force the support of the kernels to be infinite, we choose the kernels directly. This particular arrangement allows the use of kernels to intentionally minimize computation via the compact support.

Following Moore-Aronszajn theorem [28a]: for every symmetric positive (semi) definite kernel K exists a unique RKHS that has K as its reproducing kernel. The corresponding RKHS is the completion of the linear space spanned by the functions of the form, $$f(x) = \sum_i K_{x_i} a_i,$$

for all choices of $\alpha \in \mathbb{R}$ which is the parameter attached to each kernel centered at the points $x_i \in \Omega$. The inner product on this space provides the reproducing property such that, $$<K(\cdot,x),f(\cdot)>_V = f(x). \tag{7a}$$

This essentially implies that we can choose an appropriate symmetric semi-positive definite kernel with compact support and this kernel has a unique RKHS associated with it. The Gaussian kernels is an example of reproducing kernels. However, due its infinite support, parameterizing velocity fields with Gaussians in dense image matching may be expensive. Using reproducing kernels to generate transformations is not new in LDDMM. Studies usually [9a], [3a], [6a] utilize reproducing kernels such as Gaussian kernels to parametrize velocity fields.

A regularization term usually is required to ensure sufficient smoothness in the solution of the ODE. In flow-based registration schemes, this term is usually formulated as the squared norm on the velocity field. Given a reproducing kernel, the evaluation of the squared norm is simply the kernel product and does not depend on any spatial discretization like other regularization terms such as bending energy of B-Splines. The regularization term may be evaluated as, $$E_R(\varphi) = \|v\|_V^2.$$

and by linearity of the inner product and the reproducing property associated with the corresponding RKHS (7a), the norm on linear combinations of the kernel can be evaluated by $$\|\sum_i K(\cdot, x_i)a_i\|^2 = \left\langle \sum_i K(\cdot, x_i)a_i, \sum_i K(\cdot, x_j)a_j \right\rangle_V = \tag{8a}$$

$$\sum_{i,j} \langle K(\cdot, x_i)a_i, K(\cdot, x_i)a_i \rangle_V = \sum_{i,j} a_i^T K(x_i, x_j) a_j.$$

Because of this reproducing property, it is often useful to parametrize the optimal function directly using these kernels since optimal solutions are linear combinations of the reproducing kernels of the norm. In case of infinitely supported kernels like the Gaussian, the entire double sum needs to be evaluated which can be computationally expensive depending the number of kernels. In contrast, with finite support, the kernel product is zero outside the support making the evaluation of (8a) efficient.

We will now outline extending the kernel bundle concept [9a] to compactly supported reproducing kernels and use it in the SVF framework.

The reasoning behind the need for a multiscale representation of a deformation has been well discussed [3a], [9a]. In brief, image deformations often occur at different scales. For instance, in inter-subject registration large scale transformations may be required and in intra-subject registration relatively smaller scaled deformations are required. For example, the deformations around hippocampus can be small while in regions like cerebrospinal fluid, the deformation may be larger. The key is to obtain computationally efficient representations of transformations without limiting the range and capacity of the deformation. This can be achieved by combining multiple kernels at multiple scales in the same registration framework. Typically in a kernel-based image registration scheme, the support (or scale) of the kernel is fixed. For instance in cubic-spline, the support is fixed to four by design.

The kernel bundle framework in LDDMM [9a] incorporates multiple scales of kernels as a sum in the same optimization function. We utilize the fact that the sum of multiple RKHS spaces is still RKHS. We set to achieve a similar construction with SVFs. We extend the concept of the space of velocity fields V to a family of spaces of velocity fields $\hat{V}$. We consider r spaces where each $\hat{V}_m$ is equipped with a norm $\|v_m\|_{\hat{V}_m}$, m=1 ... r. The velocity fields are linear sums of individual kernels at r levels. It is represented as, $$v(x) = \sum_{m=1}^{r} v_m = \sum_{m=1}^{r} \sum_{i_m}^{N_m} K_m(x_{i_m}, x) a_{i_m}^m. \tag{9a}$$

Here v is the final velocity field, $K_m$ is the kernel at each level and $\alpha^m$ is the parameter associated with it. The variable $i_m$ is the kernel centers at each level and $N_m$ is the number of kernels at each level. Note that $$K_m(x_{i_m}, x) = K\left(\frac{\|x_{i_m} - x\|}{q_m}\right),$$

where $q_m$ is the support of the kernel at each level. The expression of the cost function (1a) in a kernel bundle framework can be written as below:

$$\begin{cases} \arg\min_v & W(I_1, I_2(\text{Exp}(v_1))) + E(I_2, I_1(\text{Exp} - (v_1))), \\ \arg\min_v & E(I_1, I_2(\text{Exp}(v_1 + v_2)) + E(I_2, I_1(\text{Exp} - (v_1 + v_2))), \\ \vdots \\ \arg\min_v & E(I_1, I_2(\text{Exp}(\Sigma_{m=1}^L v_m)) + E(I_2, I_1(\text{Exp}(\Sigma_{m=1}^L - v_m)) \end{cases}$$

Figure 4:
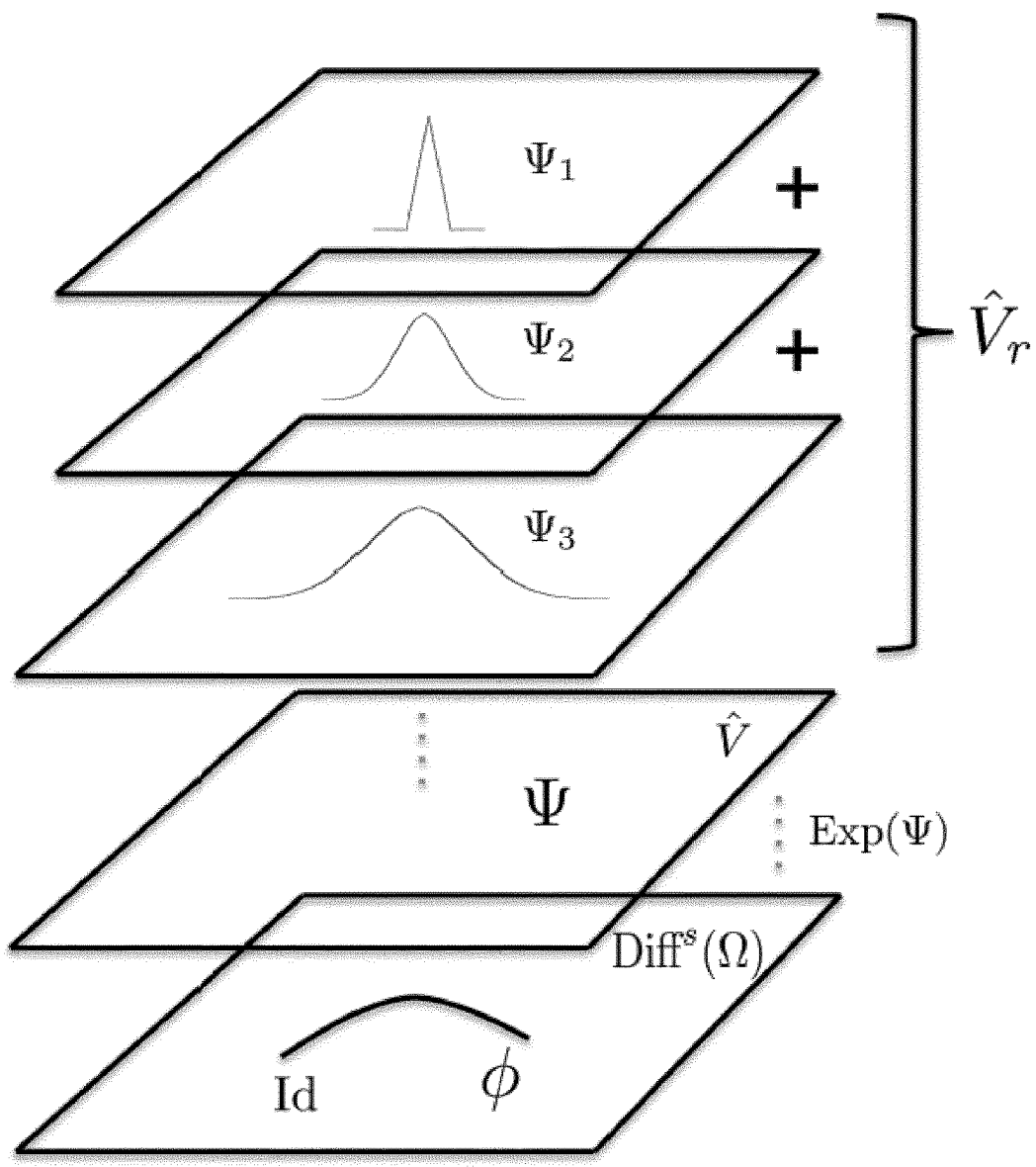
FIG. 4 shows Kernel Bundle Framework for SVFs.

The kernels at each level can be of any support. For instance, one can have infinitely supported Gaussian kernels in a coarser registration scale and have compactly supported kernels handle finer resolutions in the registration. FIG. 4 illustrates the kernel bundle framework. Different curves represent different classes of kernels.

In this section, we will describe the compactly supported Wendland kernel [21a] used in the parameterizing the velocity fields. Note that compactly supported reproducing kernels can also be constructed instead of choosing them directly. One such example is found in [6a].

Wendland kernels were originally developed for multidimensional, scattered grid interpolation. They are positive definite functions with positive Fourier transforms and minimal degree polynomials on [0, 1]. They yield $C^{2s}$ (s is the desired degree of smoothness) smooth radial basis functions on $\mathbb{R}^d$. Application of Wendland kernels in landmark registration can be found in [29a]. They are defined as follows, $$K_{d,s}(r) = \{I^s(1-r)_+^g\}, \tag{10a}$$

where s is the smoothness of the kernel, r is the Euclidean distance to the center of the kernel scaled by the support, g is the dimension given by $\lfloor d/2 \rfloor = 2c+s+1$ and $I^s$ is the integral operator applied s times given as, $$I\{K(r)\} = \int_r^\infty tK(t)dt. \tag{11a}$$

We will utilize two classes of Wendland kernels in the kernel bundle framework. They are, $$K_{1,0}(r) = (1-r)_+$$

$$K_{3,1}(r) = (1-r)_+^4(4r+1), \tag{12a}$$

FIG. 3 shows both the linear (innermost) and $C^2$ smooth Wendland kernels (outermost, middle). They all have unit coefficient. Note that Equation (10a) refers to the general family of Wendland kernels. We will however choose only particular kernels (d=3, s=1) since they emulate B-splines both in terms of the smoothness properties and the shape of the kernel.

We will optimize the kernel bundle framework in a hierarchical parallel fashion. For instance, in level one, only $v_1$ is optimized, in level two both $v_1$, $v_2$ are optimized, and so on and so forth. A limited memory Broyden-Fletcher-Goldfarb-Shanno (L-BFGS) [30a] scheme is used for optimization. The optimization was done using the min-Func package (see http://www.di.ens.fr/~mschmidt/Software/minFunc.html, version 2012). For optimization, we manually supply the derivatives. Normalized mutual information (NMI) is used as a similarity measure for both the linear transformation and non-linear transformation. We initialize the non-linear transformation with a linear transformation with 9 degrees of freedom (DOF). We refer to [31a] for formulations of the linear transformations that we use. We can write the cost function as (13a). Note that the forward and backward transformations are represented as $\varphi(x, 1)=\mathrm{Exp}(v)$ and $\varphi'(x, 1)=\mathrm{Exp}(-v)$. The derivative of the cost function at each level can be derived as (14a). In both (13a), (14a), the backward registration is computed in a similar way however by replacing v by -v. In (14a), $$\frac{\partial u}{\partial a_n^m}$$

is the derivative of the transformation with respect to the nth parameter at rth level, e(1 ... p) is the composition number (p, total number of compositions)

$$\partial c = \frac{1}{\text{number of compositions}}$$

and $D\varphi_{e-1}$ is the spatial Jacobian of the previous composition. The flow chart of the registration algorithm can be found in Algorithm 1. The parameter used for the registration can be found in Table I. For computational reasons, only every second voxel was used to evaluate the similarity measure. Note that for both inter-subject and intra-subject registration the same set of parameters are used. Note that all the r levels are optimized simultaneously depending on the level.

| Algorithm 1 wKB-SVF Registration Algorithm |
| --- |
| 1: Affine registration with 12 degrees of freedom. |
| 2: Non-rigid registration |
|     Initialization, $a_m = 0, m = 1...r$ |
| 3: loop over the number of levels r |
|     Smooth both floating and fixed image with a Gaussian of standard deviation $\sigma_f$. |
|     Compute velocity field v (9a) . |
|     Compute displacement field $\varphi = \mathrm{Exp}(v)$. |
|     Compute similarity measure NMI |
|     Compute the update $\nabla_a mE$ (14a) . |

In order to evaluate the registration on intra-subject registration we measure atrophy (or volume change) in disease (Alzheimer's disease) specific brain regions such as whole brain (WB), Hippocampus (Hip), Ventricles (Vent) and Medial Temporal Lobe (MTL).

Experiments and Results (Obtained Using the First Described Registration Method)

Image Data

Test data in the experiments were obtained from the Alzheimer's disease neuroimaging initiative (ADNI) database and the chosen subjects were the same as in [18] was used. The images were given in 256×256×256 isotropic voxel cubes where voxel dimension was 1×1×1 mm.

Simulated Bias

In this experiment, we randomly picked a case from the available dataset and multiplied an artificial bias field to the image. Atrophy was then computed as function of the strength of the bias field. The form of the multiplicative bias field was:

$$BIAS = 1 + \exp\left(-\frac{x^2 + y^2 + z^2}{2\sigma^2}\right) * \alpha$$

where x, y, z are the spatial locations, $\sigma$ is the standard deviation of the Gaussian and was chosen to be 38 and $\alpha$ is the strength of the bias field and was carried between 0.02 to 0.97.

Figure 2:
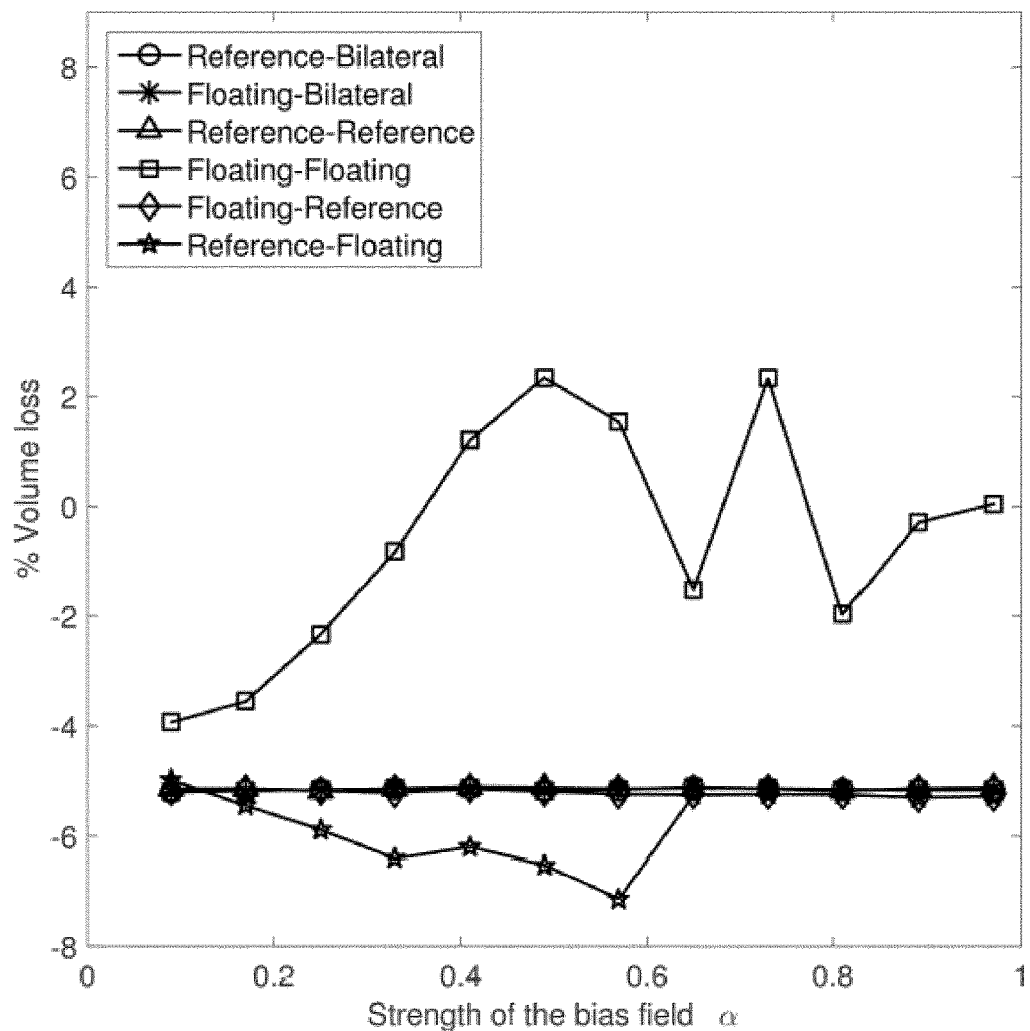
FIG. 2 is a graph that shows results obtained on hippocampus images in an evaluation of the invention described below.

Several sets of experiments were conducted using different bias correction strategies described below and results are shown in FIGS. 1 and 2. The figures show atrophy of whole brain (FIG. 1), and of hippocampus (FIG. 2) as a function of strength of the bias. y-axis represent % volume loss and x-axis represents the strength of the bias $\alpha$. The six lines represent six different settings described as follows: a) bias was multiplied to the floating image and both images were corrected during registration (Reference-Double), b) bias was multiplied to the reference image and both images were corrected during registration (Floating-Double), c) bias was multiplied to the reference image and the same image was corrected during registration (Reference-Reference), d) bias was multiplied to the floating image and the same image was corrected during registration (Floating-Floating), e) bias was multiplied to the floating image and the reference image was corrected during registration (Floating-Reference), and finally f) bias was multiplied to the reference image and the floating image was corrected during registration (Reference-Floating).

Runs (a) and (b) are in accordance with the invention.

After the registration, whole brain and hippocampus atrophy were computed using the generated deformation field. From FIG. 1 and FIG. 2, we can observe that most variations in atrophy estimation were seen when the floating image was corrected for the bias (regardless if the bias was added to floating or the reference image). Minor variations in atrophy scores were seen when the reference image was corrected for bias during registration and nearly no variations were seen when bias correction was performed on both the images (regardless of which image was corrupted with bias).

Application on ADNI Data

Two-image bias correction based registration was applied to the full dataset and atrophy in whole brain, hippocampus, ventricles and medial temporal lobe were computed. For comparison, registration without any differential bias correction was performed on the same data which was already pre-processed using Freesurfer's N3 bias correction method. To evaluate the performance of both the methods, diagnostic group separation (Cohen's D and area under the curve (AUC)) of the capabilities of the methods were inspected (AD vs. NC). Cohen's D is given by:

$$d = \frac{\mu_{AD} - \mu_{NC}}{\sqrt{\frac{\sigma_{AD}^2 + \sigma_{NC}^2}{2}}}$$

where $\mu$ and $\sigma^2$ are mean and standard deviation. To compute the p-value for the pairwise method comparison, we carried out a two-tailed t-test for the null hypothesis of equal measures $N_1-N_2=0$, where $N_1$ and $N_2$ were independent random measures. We computed a probability distribution for the difference between the Cohen's D for the two measures and computed p as $p(N_1>N_2)=1-cdf_{N_1-N_2}(0)$ and $p(N_2>N_1)=cdf_{N_1-N_2}(0)$. The p-values for comparing the AUCs were computed using the DeLong test [14].

As we can see in Table 1, both Cohen's D and AUC were similar in hippocampus, ventricles and medial temporal lobe measures for both the methods. However, the two-image bias correction method yielded significant improvement in group separation based on whole brain measurements.

TABLE 1

Various statistics based on atrophy estimated using Freesufer N3 and a method according to the invention; mean and standard deviation are in % volume loss.

|  |  | AD Mean (Std) | NC Mean (Std) | AUC | Cohen's d |
|---|---|---|---|---|---|
| Bias Correction according to the invention | WB | 1.24 (0.85) | 0.30 (0.51) | 0.85 (0.04) | 1.34 |
|  | Hip | -2.77 (1.87) | -0.70 (0.98) | 0.84 (0.04) | 1.39 |
|  | Vent | 10.19 (5.77) | 4.12 (4.72) | 0.81 (0.05) | 1.15 |
|  | MTL | -2.66 (1.81) | -0.84 (0.84) | 0.86 (0.04) | 1.30 |
| Freesurfer N3 Bias Correction | WB | -1.22 (0.90) | -0.37 (0.68) | 0.76 (0.06) | 1.07 |
|  | Hip | -3.37 (2.01) | 0.85 (1.43) | 0.85 (0.04) | 1.46 |
|  | Vent | 10.98 (6.15) | 4.39 (4.84) | 0.81 (0.05) | 1.19 |
|  | MTL | -2.82 (1.93) | -0.78 (1.26) | 0.85 (0.04) | 1.24 |

WB: Whole Brain, Hip: Hippocampus, Vent: Ventricles, MTL: Medial Temporal Lobe.
Bold text represents significance of two-image bias correction method over separate N3 bias correction method.

The example of the working of the invention above uses a simultaneous registration and two-image bias correction method and demonstrates its efficiency in atrophy scoring and diagnostic group separation capabilities. One of the key observations of the artificial example was that the reproducibility of atrophy scores was not consistent when only the floating image was corrected for bias. This may be because of the intensity re-sampling of the floating image involved during registration. This observation implies that the choice of the image on which the bias field is modeled becomes crucial. In instances such as template-image registration, care needs to be taken to make sure the bias is modeled on the image and the template is warped. The artificial examples further showed that this particular choice of bias-warp is not important when the presented (bilateral) method is used. In addition, the proposed regularization term ensures that the bias is consistently applied to both images thereby removing any bias.

Further, single-image bias model cannot be assumed for all registration applications, for instance, cross modality registration. Whereas, due to the fact that two-image bias correction method assumes independent bias models, this method is more suited for a richer range of registration applications.

In this specification, unless expressly otherwise indicated, the word 'or' is used in the sense of an operator that returns a true value when either or both of the stated conditions is met, as opposed to the operator 'exclusive or' which requires that only one of the conditions is met. The word 'comprising' is used in the sense of 'including' rather than in to mean 'consisting of'. All prior teachings acknowledged above are hereby incorporated by reference. No acknowledgement of any prior published document herein should be taken to be an admission or representation that the teaching thereof was common general knowledge in Australia or elsewhere at the date hereof.

REFERENCES

1. Ashburner, J., Friston, K.: Morphometry. In: Human Brain Function. second edn. Academic Press (2003)
2. Lewis, E. B., Fox, N. C.: Correction of differential intensity inhomogeneity in longitudinal MR images. NeuroImage 23(1) (2004) 75-83
3. Sled, J. G., Pike, G. B.: Understanding intensity non-uniformity in MRI. In: Medical Image Computing and Computer-Assisted Interventation—MICCAI'98. Volume 1496 of Lecture Notes in Computer Science. Springer Berlin Heidelberg (1998) 614-622
4. Vovk, U., Pernus, F., Likar, B.: A review of methods for correction of intensity inhomogeneity in MRI. IEEE Transactions on Medical Imaging 26(3) (March 2007) 405-421
5. Sled, J. G., Zijdenbos, A. P., Evans, A. C.: A nonparametric method for automatic correction of intensity non-uniformity in MRI data. IEEE Transactios on Medical Imaging 17(1) (February 1998) 87-97
6. Leung, K. K., Ridgway, G. R., Ourselin, S., Fox, N. C.: Consistent multi-time-point brain atrophy estimation from the boundary shift integral. NeuroImage 59(4) (2012) 3995-4005
7. Ashburner, J., Ridgway, G. R.: Symmetric diffeomorphic modelling of longitudinal structural MRI. Frontiers in Neuroscience 6(197) (2013)
8. Andersson, J., Smith, S., Jenkinson, M.: FNIRT-FMRIB's non-linear image registration tool. 14th Annual Meeting of the Organization for Human Brain Mapping (2008)
9. Holland, D., Dale, A. M.: Nonlinear registration of longitudinal images and measurement of change in regions of interest. Medical Image Analysis 15(4) (2011) 489-497
10. Modat, M., Ridgway, G. R., Hawkes, D. J., Fox, N. C., Ourselin, S.: Nonrigid registration with differential bias correction using normalised mutual information. In: IEEE International Symposium on Biomedical Imaging: From Nano to Macro. (April 2010) 356-359
11. Daga, P., Modat, M., Winston, G., White, M., Mancini, L., McEvoy, A. W., Thornton, J., Yousry, T., Duncan, J. S., Ourselin, S.: Susceptibility artefact correction by combining b0 field maps and non-rigid registration using graph cuts (2013)
12. Pai, A., Darkner, S., Sorensen, L., Larsen, L., Mysling, P., Sporring, J., Dam, E., Nielsen, M.: Evaluation of bias in brain atrophy estimation. MICCAI 2012 Workshop on Novel Imaging Biomarkers for Alzheimer's Disease and Related Disorders (NIBAD'12) (2012) 198-206

13. Rueckert, D., Sonoda, L. I., Hayes, C., Hill, D. L. G., Leach, M. O., Hawkes, D.: Non-rigid registration using free-form deformations: Application to breast MR images. IEEE Transactions on Medical Imaging 18(8) (August 1999) 712-721
14. Pai, A., Sorensen, L., Darkner, S., Mysling, P., Jorgensen, D., Dam, E., Lillholm, M., Oh, J., Chen, G., Suhy, J., Sporring, J., Nielsen, M.: Cube propagation for focal brain atrophy estimation. In: IEEE 10th International Symposium on Biomedical Imaging (ISBI). (April 2013) 402-405
15. Viola, P., Wells, III, W. M.: Alignment by maximization of mutual information. International Journal on Computer Vision 24(2) (September 1997) 137-154
16. Mattes, D., Haynor, D., Vesselle, H., Lewellen, T., Eubank, W.: PET-CT image registration in the chest using free-form deformations. IEEE Transactions on Medical Imaging 22(1) (January 2003) 120-128
17. Liu, D. C., Nocedal, J.: On the limited memory BFGS method for large scale optimization. Mathematical Programming 45(3) (December 1989) 503-528
18. Chong, K., Lau, W. C., Leong, J., Suhy, J., Oh, J.: Longitudinal volumetric MRI analysis for use in alzheimer's disease multi-site clinical trials: Comparison to analysis methods used in ADNI and correlation to MMSE change. Alzheimer's & Dementia 6(4) (2010)
[1a] M. Miller, "Computational anatomy: shape, growth, and atrophy comparison via diffeomorphisms," NeuroImage, vol. 23, no. 1, pp. 19-33, 2004.
[2a] M. Beg, M. Miller, A. Trouv e, and L. Younes, "Computing large deformation metric mappings via geodesic flows of diffeomorphisms." International Journal of Computer Vision, vol. 61, pp. 139-157, 2005.
[3a] L. Risser, F.-X. Vialard, R. Wolz, M. Murgasova, D. D. Holm, D. Rueckert, and A. D. Neuroimaging, "Simultaneous multi-scale registration using large deformation diffeomorphic metric mapping," IEEE Transactions on Medical Imaging, vol. 30, no. 10, pp. 1746-1759, 2011.
[4a] M. Bruveris, F. Gay-Balmaz, D. D. Holm, and T. S. Ratiu, "The momentum map representation of images," Journal of Nonlinear Science, vol. 21, no. 1, pp. 115-150, 2011.
[5a] M. De Craene, G. Piella, O. Camara, N. Duchateau, E. Silva, A. Doltra, J. D'hooge, J. Brugada, M. Sitges, and A. Frangi, "Temporal diffeomorphicfree-form deformation: Application to motion and strain estimation from 3D echocardiography," Medical Image Analysis, vol. 16, pp. 427-50, 2012.
[6a] A. Jain and L. Younes, "A kernel class allowing for fast computations in shape spaces induced by diffeomorphisms," Journal of Computational and Applied Mathematics, vol. 245, pp. 162-181, 2013.
[7a] J. Ashburner, "A fast diffeomorphic image registration algorithm," NeuroImage, vol. 38, no. 1, pp. 95-113, 2007.
[8a] M. Modat, P. Daga, M. J. Cardoso, and S. Ourselin, "Parametric nonrigid registration using a stationary velocity field," in IEEE Workshop on Mathematical Methods in Biomedical Image Analysis (MMBIA), 2012, pp. 145-150.
[9a] S. Sommer, F. Lauze, M. Nielsen, and X. Pennec, "Sparse multiscale diffeomorphic registration: the kernel bundle framework," J. of Mathematical Imaging and Vision, vol. 46, no. 3, pp. 292-308, 2012.
[10a] A. Sotiras, C. Davatzikos, and N. Paragios, "Deformable medical image registration: a survey," IEEE Transactions on Medical Imaging, vol. 32, no. 7, pp. 1153-1190, 2013.
[11a] A. Klein, J. Andersson, B. A. Ardekani, J. Ashburner, B. B. Avants, M.-C. Chiang, G. E. Christensen, D. L. Collins, J. C. Gee, P. Hellier, J. H. Song, M. Jenkinson, C. Lepage, D. Rueckert, P. M. Thompson, T. Vercauteren, R. P. Woods, J. J. Mann, and R. V. Parsey, "Evaluationof 14 nonlinear deformation algorithms applied to human brain mri registration," NeuroImage, pp. 786-802, 2009.
[12a] V. Arsigny, O. Commowick, X. Pennec, and N. Ayache, "A logeuclidean framework for statistics on diffeomorphisms," in Medical Image Computing and Computer-Assisted Intervention, vol. 4190, 2006, pp. 924-931.
[13a] T. Vercauteren, X. Pennec, A. Perchant, and N. Ayache, "Non-parametric diffeomorphic image registration with the demons algorithm," in Medical Image Computing and Computer Assisted Intervention (MICCAI), vol. 4792, 2007, pp. 319-326.
[14a] M. Lorenzi and X. Pennec, "Geodesics, parallel transport and oneparameter subgroups for diffeomorphic image registration," International Journal of Computer Vision, vol. 105, pp. 111-127, 2013.
[15a] V. M, M. MI, Y. L, and T. A., "Statistics on diffeomorphisms via tangent space representations," NeuroImage, vol. Suppl 1, no. 23, pp. S161-9, 2004.
[16a] N. Singh, P. Fletcher, J. Preston, L. Ha, R. King, J. Marron, M. Wiener, and S. Joshi, "Multivariate statistical analysis of deformation momenta relating anatomical shape to neuropsychological measures," Medical Image Computing and Computer-Assisted Intervention, pp. 529-537, 2010.
[17a] M. Bossa, E. Zacur, S. Olmos, and for the Alzheimer's Disease Neuroimaging Initiative., "Tensor-based morphometry with stationary velocity field diffeomorphic registration: application to adni," NeuroImage, vol. 51, no. 3, pp. 956-969, 2010.
[18a] T. Mansi, X. Pennec, M. Sermesant, H. Delingette, and N. Ayache, "iLogDemons: A demons-based registration algorithm for tracking incompressible elastic biological tissues," Int. J. Comput. Vis, vol. 92, no. 1, pp. 92-111, 2011.
[19a] M. Hernandez, M. N. Bossa, and S. Olmos, "Registration of anatomical images using paths of diffeomorphisms parameterized with stationary vector field flows," International Journal of Computer Vision, vol. 85, no. 3, pp. 291-306, 2009.
[20a] L. Younes, Shapes and Diffeomorphisms. Springer, 2010, vol. 171.
[21a] H. Wendland, "Piecewise polynomial, positive definite and compactly supported radial functions of minimal degree," Advances in Computational Mathematics, vol. 4, no. 1, pp. 389-396, 1995.
[22a] A. Pai, S. Sommer, L. Srensen, S. Darkner, J. Sporring, and M. Nielsen, "Image registration using stationary velocity fields parameterized by norm-minimizing wendland kernel," in SPIE Medical Imaging, 2015, (to appear in print).
[23a] M. Bossa, E. Zacur, and S. Olmos, "Algorithms for computing the group exponential of diffeomorphisms: Performance evaluation," Computer Vision and Pattern Recognition Workshops, pp. 1-8, 2008.
[24a] G. E. Christensen and H. J. Johnson, "Consistent image registration," IEEE Transactions on Medical Imaging, vol. 20, pp. 568-582, 2001.
[25a] A. Leow, S. Huang, A. Geng, J. Becker, S. Davis, A. Toga, and P. Thompson, "Inverse consistent mapping in 3d deformable image registration: its construction and statistical properties," in Information Processing in Medical Imaging, vol. 19, 2005, pp. 493-503.
[26a] J. Modersitzki, Numerical methods for image registration. Oxford University Press, 2004.
[27a] Q. Ye, "Reproducing kernels of generalized sobolev spaces via a green function approach with differential operators," Illinois Institute of Technology, Tech. Rep., 2010.
[28a] N. Aronszajn, "Theory of reproducing kernels," Transactions of the American Mathematical Society, vol. 68, no. 3, pp. 337-404, 1950.
[29a] M. Fornefett, K. Rohr, and H. Stiehl, "Radial basis functions with compact support for elastic registration of medical images," Image and Vision Computing, vol. 19, no. 1, pp. 87-96, 2001.
[30a] see [17]
[31a] A. Pai, L. Srensen, S. Darkner, P. Mysling, D. Jorgensen, E. Dam, M. Lillholm, J. Oh, G. Chen, J. Suhy, J. Sporring, and M. Nielsen, "Cube propagation for focal brain atrophy estimation," in IEEE symposium on biomedical imaging, 2013.
[32a] B. Wyman, D. Harvey, K. Crawford, M. Bernstein, O. Carmichael, P. Cole, P. Crane, C. Decarli, N. Fox, J. Gunter, D. Hill, R. Killiany, C. Pachai, A. Schwarz, N. Schuff, M. Senjem, J. Suhy, P. Thompson, M. Weiner, C. J. Jack, and A. D. N. Initiative, "Standardization of analysis sets for reporting results from ADNI MRI data," Alzheimer's and Dementia, October 2012.
[33a] A. C. Evans, D. L. Collins, and B. Milner, "An MRI-based stereotactic brain atlas from 300 young normal subjects," Proceedings of the 22nd Symposium of the Society for Neuroscience, p. 408, 1992.
[34a] K. J. Friston, J. Ashburner, C. D. Frith, J.-B. Poline, J. D. Heather, and R. S. J. Frackowiak, "Spatial registration and normalization of images," Human Brain Mapping, vol. 3, no. 3, pp. 165-189, 1995.
[35a] A. Nieto-Castanon, S. S. Ghosh, J. A. Tourville, and F. H. Guenther, "Region of interest based analysis of functional imaging data," NeuroImage, vol. 19, no. 4, pp. 1303-1316, 2003.
[36a] J. Tourville and F. Guenther, "A cortical and cerebellar parcellation system for speech studies," Boston University Technical Reports, Tech. Rep. CAS/CNS-03-022, 2003.
[37a] A. Dale, B. Fischl, and M. Sereno, "Cortical surface-based analysis. I. Segmentation and surface reconstruction," Neuroimage, vol. 9, pp. 179-194, 1999.
[38a] B. Zhou, A. Pai, and M. Nielsen, "Simultaneous registration and bilateral differential bias correction in brain mri," IntelMR, MICCAI workshop, 2014.
[39a] X. Hua, D. P. Hibar, C. R. Ching, C. P. Boyle, P. Rajagopalan, B. A. Gutman, A. D. Leow, A. W. Toga, C. R. J. Jr., D. Harvey, M. W. Weiner, and P. M. Thompson, "Unbiased tensor-based morphometry: Improved robustness and sample size estimates for alzheimer's disease clinical trials," Neuroimage, vol. 66, pp. 648-661, 2013.
[40a] B. Efron and R. J. Tibshirani, An introduction to the bootstrap. Chapman and Hall, New York, 1993.
[41a] D. Holland, L. McEvoy, A. Dale, and A. D. N. Initiative., "Unbiased comparison of sample size estimates from longitudinal structural measures in ADNI," Human Brain Mapping, vol. 33, no. 11, pp. 2586-2602, 2012.
[42a] E. R. DeLong, D. M. DeLong, and D. L. Clarke-Pearson, "Comparing the Areas under Two or More Correlated Receiver Operating Characteristic Curves: A Nonparametric Approach," Biometrics, vol. 44, no. 3, pp. 837-845, Sep. 1988.
[43a] C. Jack, R. Petersen, Y. Xu, P. O'Brien, G. Smith, I. R J, T. E G, and K. E., "Rate of medial temporal lobe atrophy in typical aging and alzheimer's disease," Neurology, vol. 51, no. 4, pp. 993-999, 1998.
[44a] M. Hernandez, M. N. Bossa, and S. Olmos, "Registration of anatomical images using paths of diffeomorphisms parameterized with stationary vector field flows," International Journal of Computer Vision, vol. 85, pp. 291-306, 2009.
[45a] C. Chefd'hotel, G. Hermosillo, and O. Faugeras, "Flows of diffeomorphisms for multimodal image registration," in IEEE International Symposium on Biomedical Imaging, 2002, pp. 753-756.
[46a] M. Bro-Nielsen and C. Gramkow, "Fast fluid registration of medical images," International Conference on Visualization in Biomedical Computing, pp. 267-276, 1996.
[47a] N. Navab, A. Kamen, and D. Zikic, "Unifying characterization of deformable registration methods based on the inherent parametrization: An attempt at an alternative analysis approach," 4th International Workshop on Biomedical Image Registration, WBIR 2010, vol. 6204, pp. 161-172, 2010.
[48a] X. Pennec, P. Cachier, and N. Ayache, "Understanding the demon's algorithm: 3d non-rigid registration by gradient descent," in Medical Image Computing and Computer-Assisted Intervention, vol. 1679, 1999, pp. 597-605.
[49a] M. Nielsen, L. Florack, and R. Deriche, "Regularization, scale-space, and edge detection filters," ECCV, vol. 1065, pp. 70-81, 1996.
[50a] W. Shi, M. Jantsch, P. Aljabar, L. Pizarro, W. Bai, H. Wang, D. O'Regan, X. Zhuang, and D. Rueckert, "Temporal sparse free-form deformations," Medical Image Analysis, vol. 17, no. 7, pp. 779-789, 2013.
[51a] E. Haber and J. Modersitzki, "A multilevel method for image registration," SIAM Journal on scientific computing, vol. 27, no. 5, pp. 1594-1607, 2006.
[52a] W. Cai and J. Wang, "Adaptive multiresolution collocation methods forinitial boundary value problems of nonlinear pdes," SIAM J. Numer. Anal., vol. 33, no. 3, pp. 937-970, 1996.

The invention claimed is:

1. A computer-implemented method of computer image processing of data sets representing images to achieve bias correction and image registration, each image of the images including a bias in intensity within the image of unknown magnitude, the method comprising:
   receiving, at a computer, a digital data set of a first image and a digital data set of a second image;
   transforming, by the computer, the first image into a transformed image that is an optimized approximation of the second image by calculating a deformation of said first image and
   applying, during the calculating, a first bias correction to said first image or said transformed image; and
   applying, during the calculating, a second bias correction to said second image such that each of the first image or the transformed image and the second image is simultaneously individually corrected for bias.

2. The computer-implemented method as claimed in claim 1, wherein an average of the first bias correction over the first image or the transformed image is equal and opposite to an average of the second bias correction over said second image.

3. The computer-implemented method as claimed in claim 1, further comprising obtaining said digital data set of the first image and said digital data set of the second image via a magnetic resonance imaging (MRI) scanner.

4. The computer-implemented method as claimed in claim 3, wherein said digital data set of the first image and said digital data set of the second image is of a brain or a part thereof.

5. The computer-implemented method as claimed in claim 1, wherein each of said digital data set of the first image and said digital data set of the second image represents an image of the same object from the same viewpoint obtained at spaced time points.

6. The computer-implemented method as claimed in claim 1, wherein each of said digital data set of the first image and said digital data set of the second image represents an image of a different instance of the same type of object from the same viewpoint.

7. The computer-implemented method as claimed in claim 6, wherein one of the first image and the second image is adopted as fiducial and each of a pair of other images is subjected to bias correction and registration with said fiducial image, to further define the bias correction for said fiducial image.

8. The computer-implemented method as claimed in claim 1, wherein said first bias correction, said second bias correction, and said deformation are conducted by optimizing an objective function including a term that is minimised when the images are optimally registered.

9. The computer-implemented method as claimed in claim 8, wherein said objective function further comprises a regularisation term that penalises deviation from linearity of calculated parameterised bias and deformation fields.

10. The computer-implemented method as claimed in claim 8, wherein said objective function further comprises a term constraining an average bias applied to each image to be essentially equal and opposite.

11. The computer-implemented method as claimed in claim 5, further comprising
determining, based on the first image or the transformed image and the second image a change of size of said object between said time points.

12. A computer programmed to process data sets of representing images to achieve bias correction and image registration, each image including a bias in intensity within the image of unknown magnitude, the computer being programmed to:
accept, as input, a first data set representative of a first image and a second data set representative of a second image;
transform the first image into a transformed image that is an optimized approximation of the second image by calculating a deformation of said first image;
apply a first bias correction during the calculating to said first image or said transformed image; and
apply a second bias correction during the calculating to said second image such that each of the first image or the transformed image and the second image is simultaneously individually corrected for bias therein.

13. A computer-implemented method of computer image processing of data sets representing magnetic resonance imaging (MRI) images to achieve bias correction and image registration, each MRI image including a bias in intensity within the MRI image of unknown magnitude, the method comprising:
receiving, at a computer, a digital data set of a first MRI image and a digital data set of a second MRI image;
transforming, by the computer, the first MRI image into a transformed MRI image that is an optimized approximation of the second MRI image by calculating a deformation of said first MRI image;
applying, during the calculating, a first bias correction to said first MRI image or said transformed MRI image;
applying, during the calculating, a second bias correction to said second MRI image such that each of the first MRI image or the transformed MRI image and the second MRI image is simultaneously individually corrected for bias; and
determining, based on the first MRI image after bias correction or the transformed MRI image after bias correction and the second MRI image after bias correction, an amount of atrophy of an object that appears in the first MRI image or the transformed MRI image and the second MRI image.

* * * * *